No. 727,932. PATENTED MAY 12, 1903.
A. H. FREEMAN.
CAMEO GLASS.
APPLICATION FILED OCT. 19, 1899.
NO MODEL.

WITNESSES:
William P. Goebel
Rev. G. Hostetz

INVENTOR
A. H. Freeman
BY
ATTORNEYS

No. 727,932. Patented May 12, 1903.

UNITED STATES PATENT OFFICE.

ALFRED HENRY FREEMAN, OF MOUNT VERNON, NEW YORK.

CAMEO GLASS.

SPECIFICATION forming part of Letters Patent No. 727,932, dated May 12, 1903.

Application filed October 19, 1899. Serial No. 734,065. (No model.)

*To all whom it may concern:*

Be it known that I, ALFRED HENRY FREEMAN, of Mount Vernon, in the county of Westchester and State of New York, have invented a new and Improved Cameo Glass, of which the following is a full, clear, and exact description.

The object of the invention is to provide a new and improved cameo glass designed for use in colored-glass windows or other articles utilized for ornamental purposes or for glassware and arranged to represent in relief any pattern or predetermined design in the desired colors to produce a highly artistic effect and enhance the appearance of the article.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
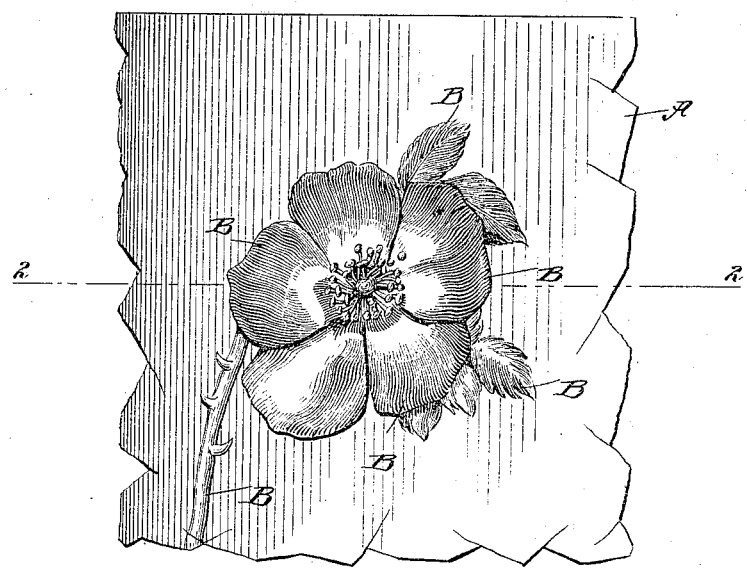
Figure 2:
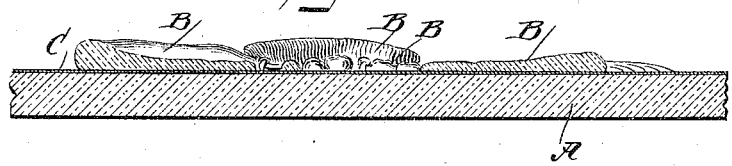
Figure 3:
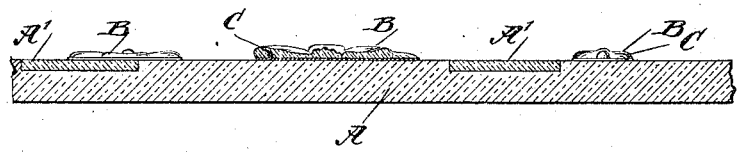

Figure 1 is a face view of the improvement. Fig. 2 is a sectional side elevation of the same on the line 2 2 in Fig. 1, and Fig. 3 is a similar view of a modified form of the improvement.

In the manufacture of cameo glass a glass body A of suitable thickness, shape, and color is employed, and on the face thereof are assembled pieces of glass B of the same homogeneity as that of the glass body, the pieces of glass being selected as to shape and color to correspond to the parts of a unitary design, the pieces being assembled on said body to form the predetermined design in relief, so as to produce a cameo effect. The pieces B are secured to the face of the glass body A by the use of a suitable flux C, applied either to the face of the glass body A or the under side of the pieces B, or to both, and when the pieces have been assembled as described on the glass body then the article is placed in a muffle and gradually heated, so as to cause the flux to fuse the pieces upon the glass body A, the flux hardening upon cooling the muffle and the article contained therein, so that when the latter is removed from the muffle the pieces are securely attached to and form part of the glass body A.

In the practical carrying out of my invention the flux I employ is a glass or crystal flux, and manifestly this flux must be capable of melting at a temperature slightly below the melting-point of the glass body and the pieces applied thereto, so that the selected pieces of the glass design are fused to the glass body by a practically homogeneous connection.

In preparing the article the entire face of the glass body A may be covered with flux, so that the remaining portions of the face now occupied by the pieces B produce the usual glazed surface on the body to enhance the appearance of the article. The glass body may be provided with pieces of glass A', embedded in the glass and flush with the surface thereof, to form a background for the assembled pieces B to increase the artistic effect of the article. The pieces A' are embedded in the glass body when it is manufactured in the usual manner, and said pieces are preferably of a different color than that of the body.

The pieces B are produced by splitting a piece of glass to form flat pieces, and these pieces are selected as to color for a predetermined design and are trimmed according to the shape of the parts they are to represent, and when said pieces are assembled it is evident that they produce a design in relief having a highly artistic effect. Owing to the nature of the pieces B, the under sides thereof are not perfectly smooth, and in assembling and fusing the pieces for the purpose described an edge portion of one piece may overlap part of another piece, thus giving the product a close appearance to that of its prototype—as, for instance, in a rose the leaves of the flower overlap, and so do the pieces B, representing the leaves.

For small pieces—such, for instance, as are necessary to form the center of a flower, as shown in Fig. 1—it is desirable to place the flux not only on the under side of the pieces, but also on the top and sides thereof, so as to securely hold the pieces in position, and as the flux is selected from a clear white color it does not detract from the general appearance of the small pieces forming the center of the flower. In this application of the flux it will be understood that it not only operates to fuse the pieces constituting the design separately to the glass body, but also to fuse the adjoining pieces together, thus perfecting the similarity between my product and one formed from a single piece of glass, this resemblance being heightened by covering the entire face of the body with the glass flux, as before described.

It is understood that it is of great importance that the glass body A and the pieces B be of the same homogeneous material, as otherwise the glass body or the pieces would crack or craze when fired, and it is also of importance that the fusing take place in a muffle instead of an open hearth and that the temperature be gradually increased to the fusing-point and that the muffle be gradually cooled to avoid possible cracking or crazing of the cameo glass. This cracking or crazing is liable to occur if the cooling is not extremely gradual, as the difference in the thickness of the body and the pieces is frequently such that one has taken up more heat than the other during the heating, and if a rapid cooling should take place the one would contract faster than the other and crazing or cracking would be the result. It will also be seen that by the arrangement described no leading whatever is required, as the glass pieces are securely fastened in place on the glass body, and consequently the costly and troublesome leading process heretofore practiced is completely avoided.

Having thus fully described my invention, I claim as new and desire to secure by Letters Patent—

1. A new article of manufacture substantially as described comprising a glass body, a plurality of pieces of glass arranged on said body and partially overlapping each other in producing a predetermined design and a glass binder over and between said glass pieces and between the same and the body and fused by heat forming a homogeneous and practically integral article substantially as set forth.

2. A new article of manufacture consisting of a homogeneous and practically integral article composed of a glass body, pieces of glass arranged on and projecting from the face of said body and partially overlapping each other and producing an ornamental design, and a glass binder uniting said pieces and body, substantially as set forth.

ALFRED HENRY FREEMAN.

Witnesses:
   THEO. G. HOSTER,
   EVERARD BOLTON MARSHALL.